United States Patent
Hay et al.

(10) Patent No.: US 9,845,829 B2
(45) Date of Patent: Dec. 19, 2017

(54) RADIAL MAGNETIC BEARING AND METHOD OF MANUFACTURE

(71) Applicants: Stephane Hay, Ingremare (FR); Nicolas Soulier, Fontaine Bellenger (FR)

(72) Inventors: Stephane Hay, Ingremare (FR); Nicolas Soulier, Fontaine Bellenger (FR)

(73) Assignee: SKF MAGNETIC MECHATRONICS, Saint-Marcel (FR)

(*) Notice: Subject to any disclaimer, the term of this patent is extended or adjusted under 35 U.S.C. 154(b) by 558 days.

(21) Appl. No.: 14/517,770

(22) Filed: Oct. 17, 2014

(65) Prior Publication Data

US 2015/0137643 A1     May 21, 2015

(30) Foreign Application Priority Data

Oct. 17, 2013  (EP) .................................... 13306427

(51) Int. Cl.
  *F16C 43/04*     (2006.01)
  *F16C 32/04*     (2006.01)
  (Continued)

(52) U.S. Cl.
  CPC ........ *F16C 32/0474* (2013.01); *B23P 15/003* (2013.01); *F16C 32/048* (2013.01);
  (Continued)

(58) Field of Classification Search
  CPC .............. F16C 32/0461; F16C 32/0468; F16C 32/048; F16C 32/0474; F16C 43/04;
  (Continued)

(56) References Cited

U.S. PATENT DOCUMENTS 4,634,191 A * 1/1987 Studer ................. F16C 32/0444
                                                     310/90.5
4,720,649 A    1/1988 Habermann et al.
(Continued)

FOREIGN PATENT DOCUMENTS

DE         223203 A1    5/1996
JP      2000002242 A    1/2000
WO     2012032362 A1    3/2012

*Primary Examiner* — Naishadh Desai
(74) *Attorney, Agent, or Firm* — Bryan Peckjian; SKF USA Inc. Patent Dept.

(57) ABSTRACT

A radial magnetic bearing having an inner rotor including a central shaft having a ferromagnetic armature mounted on the shaft and an outer stator providing a plurality of electromagnets including poles made of ferromagnetic material which project radially inwardly towards the rotor is provided. As such, air-gaps (e) are left between end faces of the poles and the ferromagnetic armature, and coils wound around the poles. The poles are extended through outer portions attached to a supporting member. Each pole and the corresponding outer portion are included in an angularly segmented module providing a stack of laminations made of ferromagnetic material. The outer portion defines shoulders with respect to the corresponding pole, the outer portion contacting outer portions of neighboring segmented modules and the outer portions of all segmented modules being assembled by clamping rings, wherein the coils located in free spaces around the poles are mounted in a string.

10 Claims, 4 Drawing Sheets

(51) Int. Cl.
*B23P 15/00* (2006.01)
*F16C 43/00* (2006.01)

(52) U.S. Cl.
CPC ...... *F16C 32/0461* (2013.01); *F16C 32/0468* (2013.01); *F16C 43/00* (2013.01); *F16C 43/04* (2013.01); *F16C 2202/42* (2013.01); *F16C 2300/02* (2013.01); *Y10T 29/49009* (2015.01)

(58) Field of Classification Search
CPC ...... F16C 43/00; F16C 32/04; F16C 2202/42; F16C 2300/02; B23P 15/003; B23P 15/00; Y10T 29/49009; H02K 7/09
USPC .................................................. 310/90.5, 90
See application file for complete search history.

(56) References Cited

U.S. PATENT DOCUMENTS

| | | | | |
|---|---|---|---|---|
| 5,818,137 | A * | 10/1998 | Nichols | F16C 32/0448 310/178 |
| 5,840,070 | A * | 11/1998 | Wampler | F16C 39/063 417/423.1 |
| 2002/0047433 | A1 * | 4/2002 | Sekiyama | B29C 45/5008 310/156.55 |
| 2005/0135948 | A1 * | 6/2005 | Olsen | F16C 32/0448 417/423.12 |
| 2011/0101905 | A1 | 5/2011 | Filatov | |

* cited by examiner

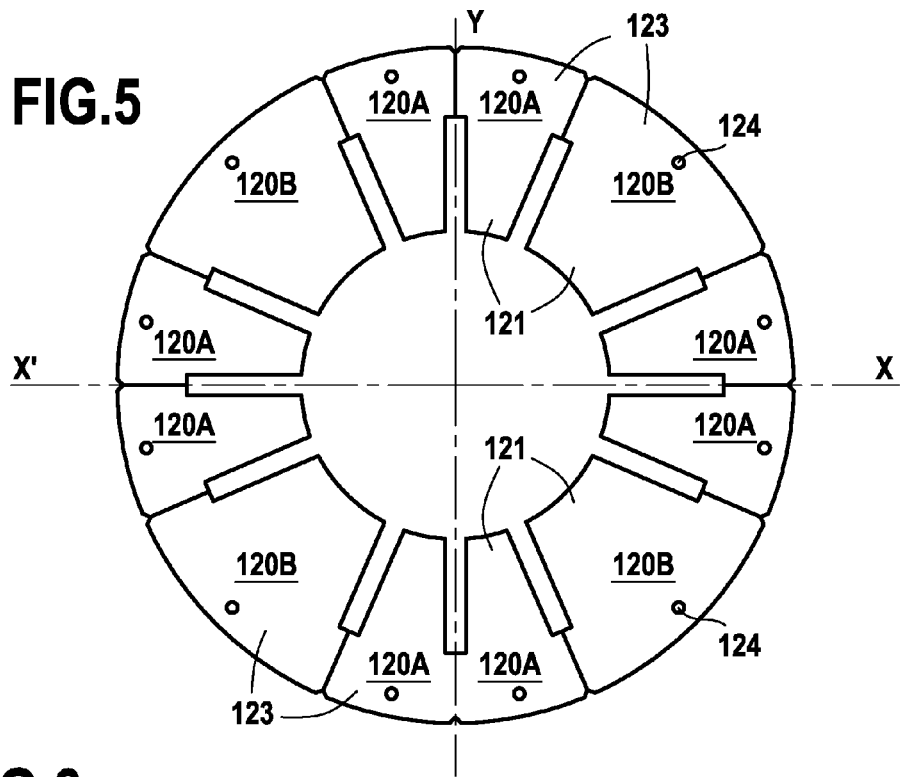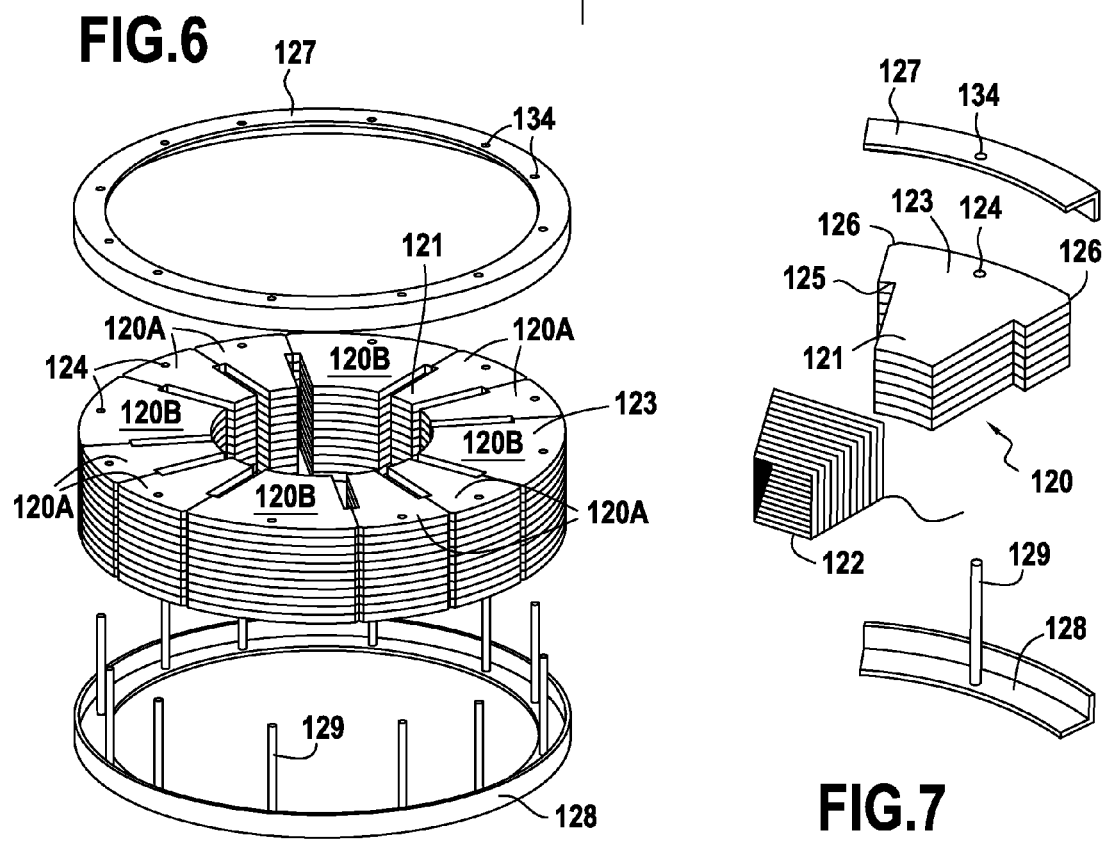

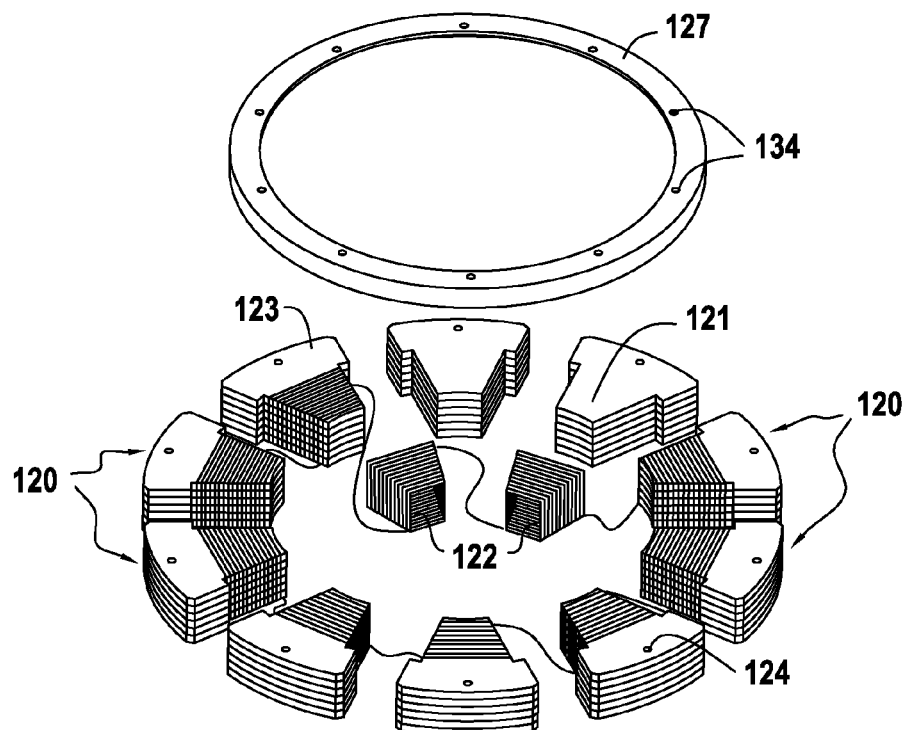
FIG.8
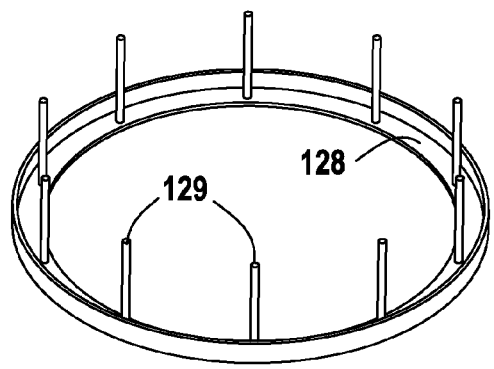
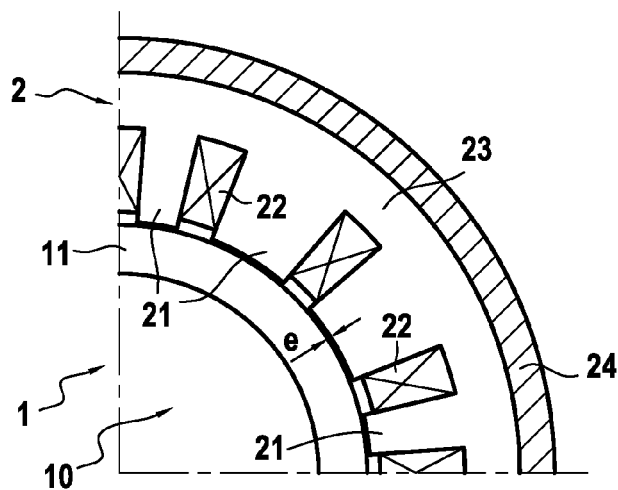
FIG.9
PRIOR ART

RADIAL MAGNETIC BEARING AND METHOD OF MANUFACTURE

FIELD OF THE INVENTION

The present invention relates to a radial magnetic bearing and a method of manufacture thereof.

BACKGROUND OF THE INVENTION

An example of a known radial magnetic bearing is disclosed in document U.S. Pat. No. 4,720,649 A. A portion (quadrant) of such a kind of known radial magnetic bearing is illustrated in FIG. 9. Such a radial magnetic bearing comprises a stator 2 surrounding a rotor 1. The rotor 1 comprises a central shaft 10 having a stack of high quality magnetic laminations 11 around its periphery, the laminations being made of a material such as stainless ferritic iron or silicon iron. The stator 2 comprises a magnetic circuit having a peripheral portion 23 which interconnects a plurality of pairs of poles 21 which project radially inwardly towards the rotor 1. Electromagnetic windings 22 are disposed around the various poles 21. The complete stator comprises at least four pairs of poles 21 disposed along two mutually perpendicular axes, which makes it possible to hold the rotor 1 in a predetermined radial position. The stator 2 is enclosed in a casing 24. The poles 21 and the peripheral portion 23 of the stator 2 are made from a stack of disc-like plates or washers.

The manufacturing process implies the assembly of steel sheet elements such as the stack of disc-like plates 21, 23 which constitute so-called horn bearings and may have a large diameter. Furthermore the implementation of coils 22 implies a great number of interconnections, which is not cost effective. Consequently the manufacturing and assembly time is not in accordance with serial production. Moreover, the process of mounting coils 22 around the poles 21 requires an adaptation of the shape of the slots and horns laminations or disc-like plates, but this adaptation leads to a drop in the overall performance of the radial load capacity of the magnetic bearing.

SUMMARY OF THE INVENTION

The technical problem to be solved is to provide a radial magnetic bearing and a method of manufacture thereof which remedy the above-mentioned drawbacks.

More specifically the invention aims at providing a radial magnetic bearing having an optimized shape with respect to the load capacity, whilst being easy to assemble.

In particular, the invention aims at improving the easiness of a manufacturing process, enabling a lower cost and a high serial manufacturing process.

The invention is defined in the appended claims.

The invention more specifically relates to a radial magnetic bearing, comprising an inner rotor having an axis of rotation and including a central shaft having an outer periphery and a ferromagnetic armature mounted on the shaft on the outer periphery; and an outer stator comprising a plurality of electromagnets including poles made of ferromagnetic material which project radially inwardly towards the rotor, whilst leaving air-gaps (e) between end faces of the poles and the ferromagnetic armature, and coils wound around the poles, the poles being extended through outer portions which are attached to a supporting member, characterized in that each pole and the corresponding outer portion are included in an angularly segmented module comprising a stack of laminations made of ferromagnetic or stainless ferromagnetic material, the outer portion defining shoulders with respect to the pole, the outer portion contacting outer portions of neighboring segmented modules and the outer portions of all segmented modules being assembled by clamping rings whereas the coils located in free spaces around the poles are mounted in a string.

According to an advantageous feature of the present invention, each outer portion of each segmented module comprises rounded outer corners.

According to a specific embodiment of the invention, each outer portion of each segmented module comprises a central hole provided in the stack of laminations for mounting purposes.

In such a case, advantageously the clamping rings comprise a first clamping ring having a plurality of holes designed to be registered with the central holes of the segmented modules and a second clamping ring having a plurality of guides designed for receiving the central holes of the segmented modules and the plurality of holes of the first clamping ring.

According to a possible embodiment, the angularly segmented modules all have the same shape.

According to another possible embodiment, the angularly segmented modules have the same radial size but have different sizes in a peripheral direction of the angularly segmented modules.

More specifically, according to a possible embodiment, the poles of the angularly segmented modules comprise a first number of pairs of poles of reduced width of a first set of angularly segmented modules and a second number of poles of larger width of a second set of angularly segmented modules which are interposed between the pairs of poles of reduced width.

The number of the angularly segmented modules and of the corresponding poles may be for example equal to 12, 16 or 20.

According to a specific embodiment, the number of pairs of poles of reduced width of the first set of angularly segmented modules is equal to four and the number of the poles of larger width of the second set of angularly segmented modules which are interposed between the pairs of poles of reduced width is equal to 1, 2 or 3.

The ferromagnetic armature of the inner rotor may be made of a stack of high quality magnetic laminations, such as ferritic steel or stainless ferromagnetic iron.

The invention further relates to a method for making a radial magnetic bearing as defined here-above, comprising the steps of:

forming a plurality of angularly segmented modules, each comprising a pole and an outer portion made of a stack of laminations made of ferromagnetic or stainless ferromagnetic material, the outer portion defining shoulders with respect to the pole, forming first and second clamping rings, forming a plurality of coils connected in a string, the number of the coils being equal to the number of the poles, arranging the angularly segmented modules in such a manner that each the outer portion contacts outer portions of neighboring segmented modules, whereas free spaces are defined between the poles of adjacent segmented modules, assembling the angularly segmented modules together with the first and second clamping rings, and inserting the plurality of coils interconnected in a string in the free spaces around the plurality of poles of the segmented modules.

More specifically, the step of assembling the angularly segmented modules may comprise inserting a plurality of guides of the second clamping ring into central holes of the segmented modules and a plurality of holes of the first clamping ring.

The shape and size of the angularly segmented modules may be chosen to optimize the radial load capacity and to enable serial production.

BRIEF DESCRIPTION OF THE DRAWINGS

FIG. 5 is a complete front view of the stator of a radial magnetic bearing according to a third embodiment of the invention;

FIG. 6 is an exploded view showing an assembling process of the stator of FIG. 5;

FIG. 7 is an exploded view showing an assembling process of an individual module of a stator of a radial magnetic bearing according to the invention;

FIG. 8 is an exploded view showing an assembling process of a plurality of individual modules of a stator of a radial magnetic bearing according to the invention; and FIG. 9 is a front view of a quadrant of a radial magnetic bearing according to the prior art.

DESCRIPTION OF THE PREFERRED EMBODIMENTS

The present invention will be described in connection with preferred embodiments which are given by way of examples.

Figure 1:
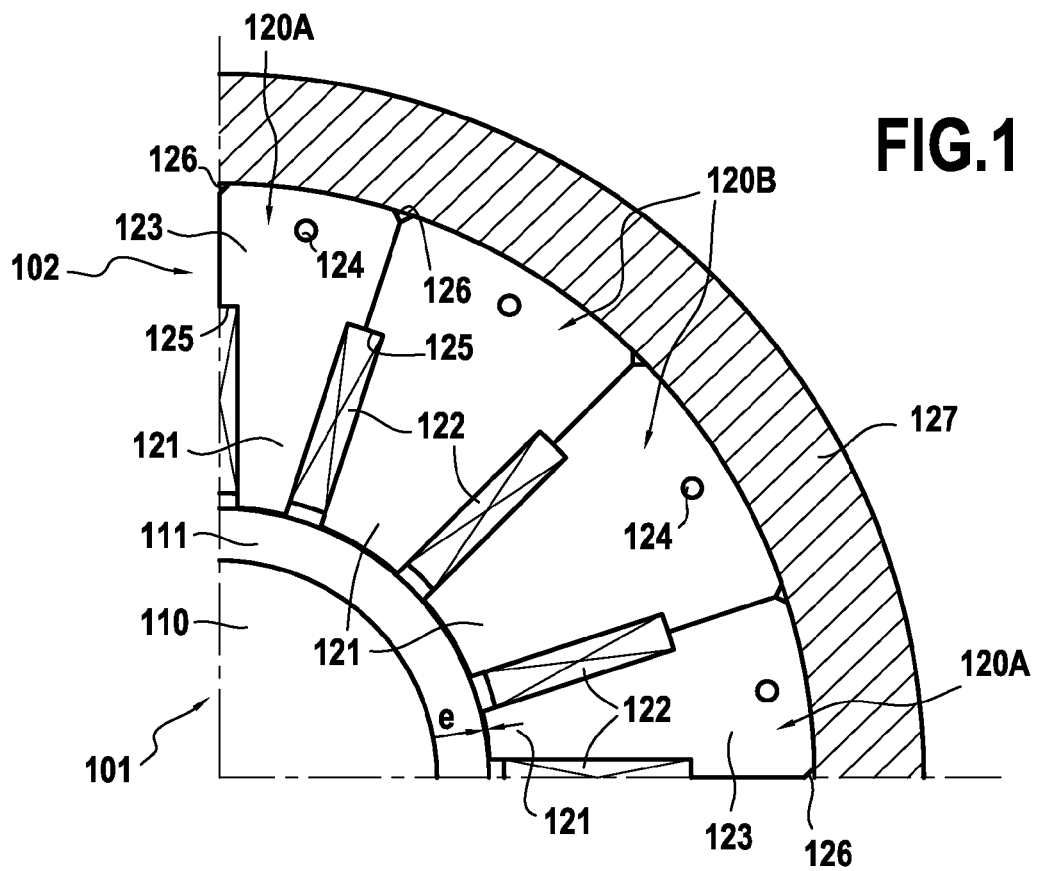
FIG. 1 is a front view of a quadrant of a radial magnetic bearing according to a first embodiment of the invention.

A typical arrangement of a first embodiment of the invention is illustrated in FIG. 1 which shows a quadrant of a radial magnetic bearing according to the invention, comprising an inner rotor 101 having an axis of rotation and including a central shaft 110 having an outer periphery. A ferromagnetic armature 111 which may be made of a stack of high quality magnetic laminations, such as stainless ferromagnetic iron, ferritic steel or silicon iron, is mounted on the outer periphery of the shaft 110. An outer stator 102 comprises a plurality of electromagnets including poles 121 made of ferromagnetic or stainless ferromagnetic material which project radially inwardly towards the rotor 101, whilst leaving air-gaps (e) between end faces of the poles 121 and the ferromagnetic armature 111, and coils 122 wound around the poles 121. A first end face of a pole 121 is thus opposite the ferromagnetic armature of the rotor 101 and defines the air-gap e. Another end of a pole 121 is extended through an outer portion 123 which is secured to a supporting member 127. Each pole 121 and its corresponding outer portion 123 are included in an angularly segmented module 120A or 120B comprising a stack of laminations made of ferromagnetic material. The outer portion 123 defines shoulders 125 with respect to the corresponding pole 121, thus providing free spaces on each side of the pole 121. The outer portion 123 of a segmented module 120A or 120B contacts outer portions 123 of neighboring segmented modules 120A or 120B essentially without air-gap and without insulating separation. However in practice an air-gap of very small value, such as for example an air-gap of 0.1 mm, may be tolerated between the outer portions 123 of two neighboring segmented modules. The outer portions 123 of all segmented modules 120A, 120B are assembled by clamping rings 127, 128. The coils 122 which are located in free spaces around the poles 121 are mounted in a string.

As shown in FIG. 1, each outer portion 123 of each segmented module 120A, 120B advantageously comprises rounded outer corners 126. Such rounded corners remove magnetic singularities and facilitate the assembly of the segmented modules 120A, 120B.

Figure 2:
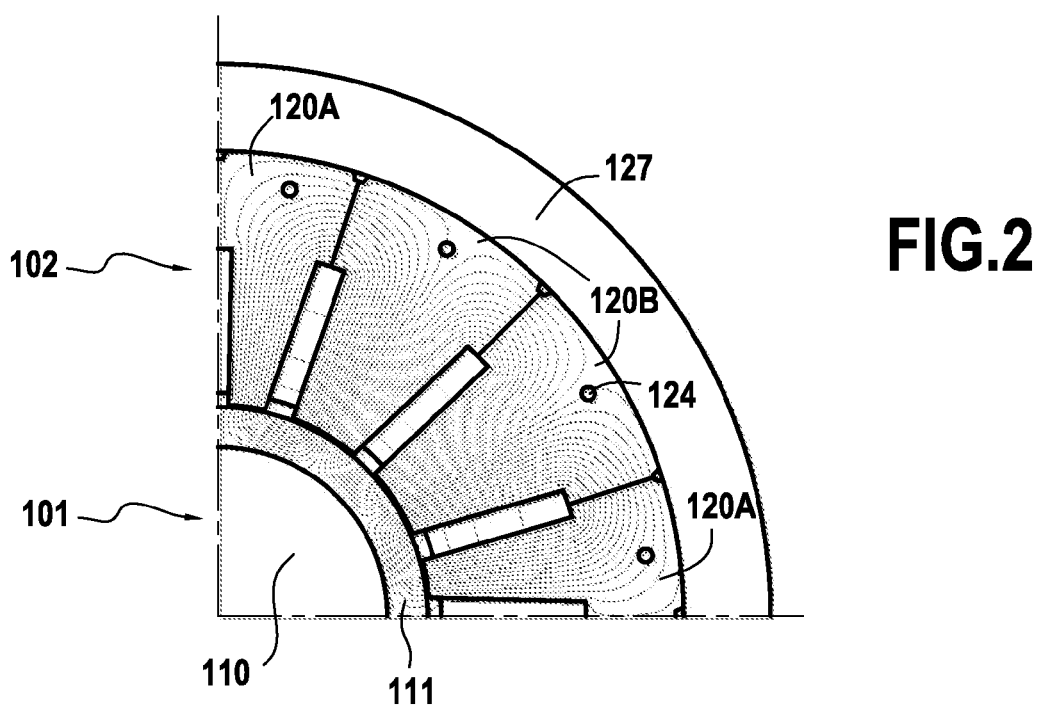
FIG. 2 is a view which is similar to the front view of FIG. 1, but further shows magnetic flux lines in the magnetic circuit of the radial magnetic bearing of FIG. 1.
Figure 3:
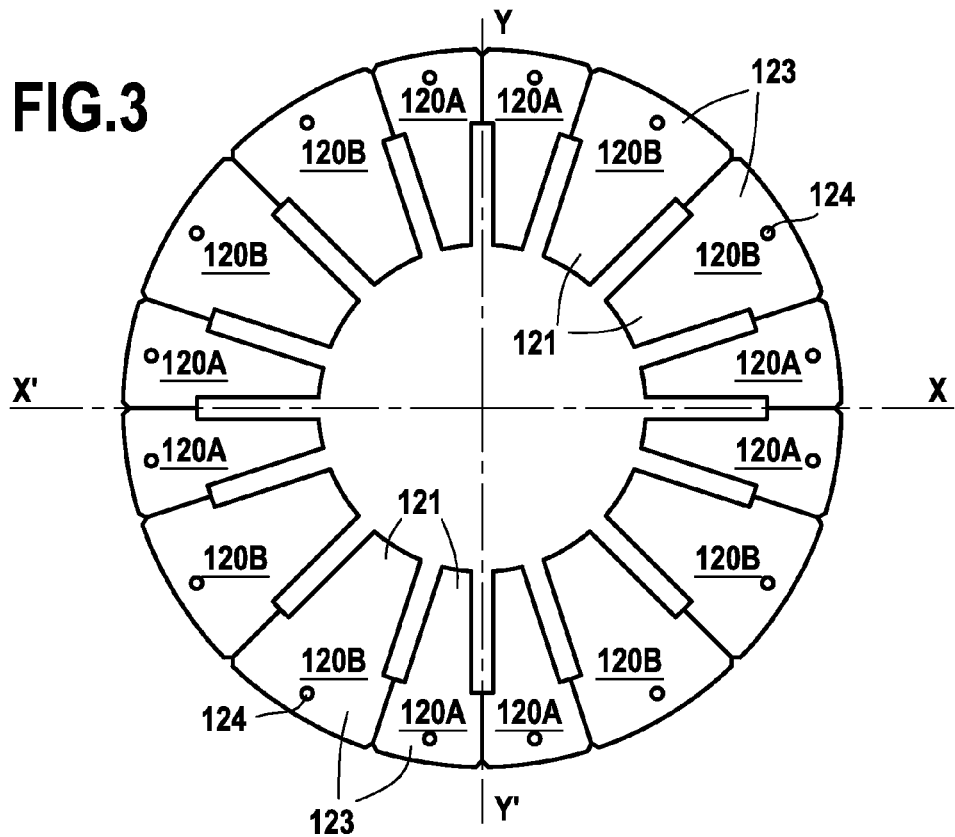
FIG. 3 is a complete front view of the stator of the radial magnetic bearing according to the first embodiment of FIG. 1.

FIG. 2 shows the magnetic flux lines in an embodiment such as the embodiment described in connection with FIG. 1.

As shown in FIGS. 1 to 8, each outer portion 123 of each segmented module 120A, 120B or 120 comprises a central hole 124 provided in the stack of laminations for mounting purposes.

An example of mounting method of the radial bearing of FIG. 1 will be described in connection with FIGS. 6 to 8.

A first clamping ring 127 has a plurality of holes 134 designed to be registered with the central holes 124 of the segmented modules 120, 120A, 120B and a second clamping ring 128 has a plurality of guides 129 such as studs or spindles designed for receiving the central holes of the segmented modules 120, 120A, 120B and the plurality of holes 134 of the first clamping ring 127.

Thus a method for making a radial magnetic bearing according to the invention essentially comprises the steps of:

forming a plurality of angularly segmented modules 120, 120A, 120B, each comprising a pole 121 and an outer portion 123 made of a stack of laminations made of ferromagnetic material, the outer portion 123 defining shoulders 125 with respect to the pole 121, forming first and second clamping rings 127, 128, forming a plurality of coils 122 connected in a string, the number of coils 122 being equal to the number of poles 121, arranging the angularly segmented modules 120, 120A, 120B in such a manner that each outer portion 123 contacts outer portions 123 of neighboring segmented modules 120, 120A, 120B essentially without air-gap and without insulating separation, free spaces being defined between the poles 121 of adjacent segmented modules 120, 120A, 120B, assembling the angularly segmented modules 120, 120A, 120B together with the first and second clamping rings 127, 128, and inserting the plurality of coils 122 interconnected in a string in the free spaces around the plurality of poles 121 of the segmented modules 120, 120A, 120B.

As already mentioned, in practice an air-gap of very small value, such as for example an air-gap of 0.1 mm, may be tolerated between the outer portions 123 of two neighboring segmented modules 120, 120A, 120B.

More specifically, the step of assembling the angularly segmented modules 120, 120A, 120B comprises inserting a plurality of guides 129 of the second clamping ring 128 into central holes 124 of the segmented modules 120, 120A, 120B and a plurality of holes 134 of the first clamping ring 127.

Generally speaking, the shape and size of the angularly segmented modules 120, 120A, 120B are chosen to optimize the radial load capacity whilst enabling serial production.

Due to the provision of wound segmented modules 120, 120A, 120B, it is possible to define the right shape aiming at obtaining optimum carrying capacity, while easily integrating the coils in this type of magnetic bearing module and therefore allowing for serial production.

Moreover since the mounting of the coils 122 is achieved through a string of coils, the number of interconnections is reduced.

Finally, the provision of first and second clamping rings 127, 128 with the cooperation of holes and studs or other guiding means enables to precisely assemble the segmented modules in adjacent contacting positions, without any insulating separation or air-gap. The segmented modules 120, 120A, 120B and clamping rings 127, 128 are radially and axially locked in a final step of assembly.

The system of angularly segmented modules according to the invention is applicable to all types of radial active magnetic bearings and all types of magnetic materials.

A specific example of coils 122 and of modules 120 comprising stacked laminations for forming a pole 121 and an outer portion 123, together with a central hole 124 and rounded corners 126 being formed in the outer portion 123 is illustrated in FIG. 7.

According to a specific embodiment, all angularly segmented modules 120 have the same shape and size, thus facilitating the manufacturing process (see e.g. FIG. 8).

However, it is also possible that the angularly segmented modules 120A, 120B have the same radial size but have different sizes in a peripheral direction of the angularly segmented modules 120A, 120B. Different types of modules of different shapes could thus be integrated in the stator 102 of a radial magnetic bearing to optimize the load capacity.

For example it is possible to design two types of segmented modules 120A, 120B, as illustrated in FIGS. 1 to 5.

In the embodiments of FIGS. 1 to 5, the poles 121 comprise a first set of pairs of angularly segmented modules 120A having poles 121 of reduced width, which e.g. may be arranged along orthogonal directions X'-X and Y'-Y and a second set of angularly segmented modules 1206 having poles 121 of larger width, which are interposed between the pairs of poles 121 of reduced width of the first set of angularly segmented modules 120A.

Figure 4:
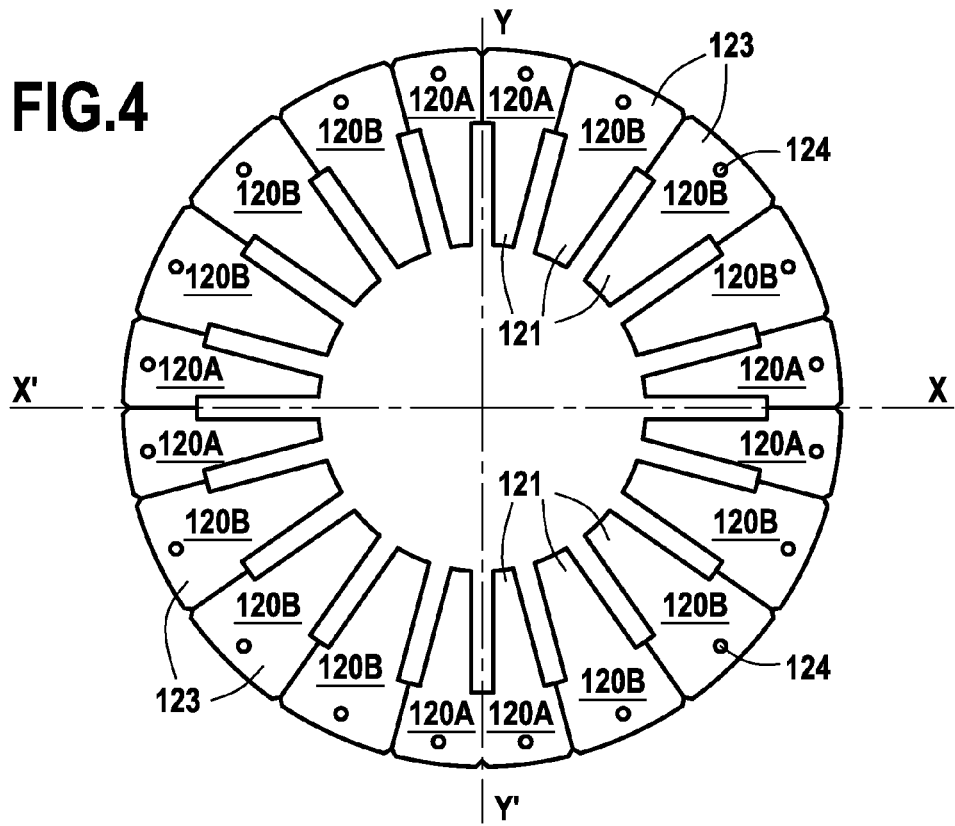
FIG. 4 is a complete front view of the stator of a radial magnetic bearing according to a second embodiment of the invention.

For example, the number of pairs of poles 121 of reduced width of the first set of angularly segmented modules 120A may be equal to four, whereas the number of the poles 121 of larger width of the second set of angularly segmented modules 1206, which are interposed between the pairs of poles 121 of reduced width, may be equal to 1 (see FIG. 5), 2 (see FIG. 1 to 3) or 3 (see FIG. 4).

Thus according to specific embodiments of the invention the total number of angularly segmented modules 120, 120A, 1206 and of the corresponding poles 121 may be equal to 12, 16 or 20, but other numbers of segmented modules 120 or 120A, 1206 are possible.

Generally speaking, the invention provides a simplification in the manufacturing process, increases performance and reduces cost.

The following non limiting list of advantages is linked with the implementation of the invention:

Optimization of the radial load capacity of the order of 30% with respect to a standard design;
Decrease of the length by 30% to 40% for the same load capacity of a conventional version of radial magnetic bearing;
Drastic reduction of the number of interconnections and failures due to the winding in rosary (i.e. arrangement of a string of coils), thus also leading to a cost reduction;
Ease of assembly and disassembly of the radial magnetic bearing comprising a stator with wound modules;
Adaptation to all magnetic materials;
Adaptation to all models and types of radial magnetic bearings;
Ability to automate the assembly of coils and modules;
Possibility of assembling the modules by tight rings or shrunk can;
Possibility of easily integrating additional sensors such as thermal sensors.

Although preferred embodiments have been shown and described, it should be understood that any changes and modifications may be made therein without departing from the scope of the invention as defined in the appended claims. Thus the features of the different embodiments may be combined.

The invention claimed is:

1. A radial magnetic bearing, comprising:
an inner rotor having an axis of rotation and including a central shaft having an outer periphery and a ferromagnetic armature mounted on the shaft on outer periphery; and
an outer stator having a plurality of electromagnets including poles made of at least one of a ferromagnetic and stainless ferromagnetic material that project radially inwardly towards the rotor, leaving air-gaps (e) between end faces of the poles and the ferromagnetic armature, and
coils wound around the poles, the poles being extended through outer portions attached to a supporting member, wherein
each pole and the corresponding outer portion are included in an angularly segmented module having a stack of laminations made of at least one of a ferromagnetic and stainless ferromagnetic material, the outer portion defining shoulders with respect to the pole, the outer portion contacting outer portions of neighboring segmented modules and the outer portions of all segmented modules being assembled by clamping rings, and wherein
coils located in free spaces around the poles are mounted in a string.

2. The radial magnetic bearing according to claim 1, wherein each outer portion of each segmented module has rounded outer corners.

3. The radial magnetic bearing according to claim 2, wherein each outer portion of each segmented module includes a central hole provided in the stack of laminations for mounting purposes.

4. The radial magnetic bearing according to claim 3, wherein the clamping rings further comprise a first clamping ring having a plurality of holes designed to be registered with the central holes of the segmented modules and a second clamping ring having a plurality of guides designed for receiving the central holes of the segmented modules and the plurality of holes of the first clamping ring.

5. The radial magnetic bearing according to claim 4, wherein the angularly segmented modules all have the same shape.

6. The radial magnetic bearing according to claim 4, wherein the angularly segmented modules have the same radial size but have different sizes in a peripheral direction of the angularly segmented modules.

7. The radial magnetic bearing according to claim 4, wherein the poles of the angularly segmented modules further comprise a first number of pairs of poles of reduced width of a first set of angularly segmented modules and a second number of poles of larger width of a second set of angularly segmented modules which are disposed between the pairs of poles of reduced width.

8. The radial magnetic bearing according to any claim 7, wherein the number of the angularly segmented modules and of the corresponding poles is equal to one of 12, 16 and 20.

9. The radial magnetic bearing according to claim 7, wherein the number of pairs of poles of reduced width of the first set of angularly segmented modules is equal to four and the number of the poles of larger width of the second set of angularly segmented modules disposed between the pairs of poles of reduced width is equal to one of 1, 2 and 3.

10. The radial magnetic bearing according to claim 9, wherein the ferromagnetic armature of the inner rotor is made of a stack of high quality magnetic laminations.

* * * * *